United States Patent
Koyama

(10) Patent No.: US 8,172,674 B2
(45) Date of Patent: May 8, 2012

(54) GAME CHIP, GAME CHIP WRITER/READER, AND GAME CHIP MONITORING SYSTEM

(75) Inventor: Toshimi Koyama, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 666 days.

(21) Appl. No.: 12/210,505

(22) Filed: Sep. 15, 2008

(65) Prior Publication Data

US 2009/0104981 A1 Apr. 23, 2009

(30) Foreign Application Priority Data

Oct. 17, 2007 (JP) .................... 2007-270589

(51) Int. Cl.
*A63F 9/24* (2006.01)
(52) U.S. Cl. ................ 463/29; 463/25; 463/47; 705/67
(58) Field of Classification Search ............ 705/50, 705/64; 463/43, 47
See application file for complete search history.

(56) References Cited

U.S. PATENT DOCUMENTS

| | | | |
|---|---|---|---|
| 7,822,641 B2* | 10/2010 | Abbott et al. | 705/25 |
| 2006/0154731 A1* | 7/2006 | Koyama et al. | 463/43 |
| 2006/0223639 A1* | 10/2006 | Koyama et al. | 463/47 |
| 2008/0214312 A1* | 9/2008 | Richard | 463/47 |

FOREIGN PATENT DOCUMENTS

| | | |
|---|---|---|
| JP | 2001-293242 | 10/2001 |
| JP | 2003-144742 | 5/2003 |

* cited by examiner

*Primary Examiner* — Jamie Kucab
(74) *Attorney, Agent, or Firm* — KMF Patent Services, PLLC; Kenneth M. Fagin

(57) ABSTRACT

A game chip writer for writing at least identification information in a game chip used for a game includes an encryption unit for encrypting at least part of recording-information with use of a private key and a writing unit for writing the encrypted information. A game chip reader includes a reading unit for reading the encrypted information from the game chip and a decryption unit for decrypting the read information with use of a public key.

4 Claims, 8 Drawing Sheets

GAME CHIP, GAME CHIP WRITER/READER, AND GAME CHIP MONITORING SYSTEM

CROSS-REFERENCE TO RELATED APPLICATIONS

This application claims priority of Japanese Patent Application No. 2007-270589 filed on Oct. 17, 2007. The contents of this application are incorporated herein by reference in their entirety.

BACKGROUND OF THE INVENTION

1. Field of the Invention

The present invention relates to a game chip, a game chip writer, a game chip reader, and a game chip monitoring system, which are applicable to game chips for use in casinos and devices or systems handling the game chips, for example.

2. Description of the Related Art

Game chips exchanged with a currency are used in live games such as poker and roulette played in casinos. The game chips are supplied by lending them in casinos; are used in games; and are paid out as a reward in the case where a player wins. These game chips are various in price. In the United State, for example, those which are as high as 5000 US dollars in price are used. The abovementioned game chips are different in color or shape, depending on their price (value) or types of casinos. However, the game chips can be easily counterfeited because their shape and structure are simple, and counterfeit game chips become a major problem associated with casino management.

In order to solve the abovementioned problem, in these days, there have been proposed that IC tags are applied to game chips (including those for use in casinos), thereby allowing a chip reader to identify identification information on a gaming facility (a casino), price, and a chip-number or the like. Examples of the related art of such type are disclosed in Japanese Laid-open Patent Publication Nos. 2001-293242 and 2003-144742. The above disclosures of the related art set forth that lowly-priced game chips for use in one casino are prevented from being illegally used as highly-priced game chips in the other casino and that the illegal use of the counterfeit game chips is prevented.

However, in the case where identification information is directly recorded in each of the game chips, a fraudulent player can acquire the identification information if he or she obtains a reading device, and can counterfeit game chips by keeping track of regularity or the like, of the identification numbers, from the identification information on the plurality of game chips.

Furthermore, in the case where a central server in a casino judges whether the game chip is counterfeit or genuine, based on the identification information provided by each of the chip readers, the central server is often overloaded due to concentration of operation. If a network connecting each of the chip readers and the central server fails, the center server cannot make the above judgment.

It is conceivable that the identification information is recorded after being encrypted in the game chip. However, even in this case, there arises a problem caused by concentration of operation or a problem associated with a network failure in the case where the central server decrypts the encrypted information or makes the above judgment. Even in this case, if the fraudulent player obtains an encryption key fraudulently, he or she can counterfeit the game chips. For example, in the case where the chip reader is installed in a so-called tray or a chip holder, the encryption key could be found if the tray or the chip holder itself is carried away altogether.

Therefore, a need exists for the advent of a game chip, a game chip writer, a game chip reader, and a game chip monitoring system, which are capable of preventing a fraudulent act without concentrating operation on a center-side device and moreover, executing a desired operation even in the event of a failure associated with a communication path.

SUMMARY OF THE INVENTION

A first aspect of the present invention is directed to a game chip used for a game, recording recording-information including at least identification information including at least identification information. The game chip records the recording-information at least partially encrypted with use of a private key.

According to the first aspect of the present invention, a fraudulent act can be prevented without concentrating operation on a center-side device and further, a desired operation is executable in the event of error in a communication path.

A second aspect of the present invention is directed to a game chip constituted as set forth below. In the first aspect, original data of the information to be encrypted is at least partially compressed by a hash function.

According to the second aspect of the present invention, the information can be confirmed based on a digital signature.

A third aspect of the present invention is directed to a game chip writer for writing recording-information including at least identification information in a game chip used for a game. The game chip writer includes an encryption unit for encrypting at least partially the recording-information with use of a private key; and a writing unit for writing the encrypted information in the game chip.

According to the third aspect of the present invention, a fraudulent act can be prevented without concentrating operation on a center-side device and further, a desired operation is executable in the event of error in a communication path.

A fourth aspect of the present invention is directed to a game chip writer constituted as set forth below. In the third aspect, the game chip writer further includes a compression unit for at least partially compressing, by a hash function, original data of the information to be encrypted, the compression unit for passing the information on to the encryption unit.

According to the fourth aspect of the present invention, the information can be confirmed based on a digital signature.

A fifth aspect of the present invention is directed to a game chip reader for reading out recording-information at least partially encrypted with use of a private key, from a game chip used for a game. The game chip reader includes a reading unit for reading out the encrypted information from the game chip; and a decryption unit for decrypting the read information with use of a public key.

According to the fifth aspect of the present invention, a fraudulent act can be prevented without concentrating operation on a center-side device and further, a desired operation is executable in the event of error in a communication path.

A sixth aspect of the present invention is directed to a game chip reading device as set forth below. In the fifth aspect, the game chip reader further includes an original data downloading unit for downloading original data used for a digital signature, from an outside; an outside original data compression unit for compressing, by a hash function, the original data downloaded from the outside; and a signature verification unit for collating the original data after being compressed by the outside original data compression unit with compressed original data set in the decrypted information.

According to the sixth aspect of the present invention, the information can be confirmed based on a digital signature.

A seventh aspect of the present invention is directed to a game chip monitoring system including: (i) a game chip for recording recording-information including identification information, the recording-information at least partially encrypted with use of a private key; (ii) a game chip writer including: an encryption unit for encrypting at least partially the recording-information of the game chip with use of the private key; and a writing unit for writing in the game chip the information encrypted by the encryption unit; and (iii) a game chip reader including: a reading unit for reading out the encrypted information from the game chip; and a decryption unit for decrypting, with use of a public key, the information read out by the reading unit.

According to the seventh aspect of the present invention, a fraudulent act can be prevented without concentrating operation on a center-side device and further, a desired operation is executable in the event of error in a communication path.

An eighth aspect of the present invention is directed to a game chip monitoring system as set forth below. In the seventh aspect, original data of the information to be encrypted, the information being recorded in the game chip in the itemized (i), is compressed at least partially, by a hash function; the game chip writer in the itemized (ii) further includes: a compression unit for compressing at least partially by a hash function, the original data of the information to be encrypted, the compression unit for passing the information on to the encryption unit; and the game chip reader in the itemized (iii) further includes: an original data downloading unit for downloading original data used for a digital signature from an outside; an outside original data compression unit for compressing at least partially, by a hash function, the original data downloaded from the outside; and a signature verification unit for checking the original data after being compressed by the outside original data compression unit against compressed original data set in the decrypted information.

According to the eighth aspect of the present invention, the information can be confirmed based on a digital signature.

A ninth aspect of the present invention is directed to a game chip monitoring system including a card for storing player's information; a game chip for compressing the player's information stored in the card by a predetermined function, the game chip for storing the compressed player's information in an encrypted condition with use of a private key; a gaming table capable of reading the player's information stored in the card and the compressed/encrypted information stored in the game chip; and a controller for receiving the information read from the gaming table, the controller being configured to: (i) compress, by the predetermined function, the player's information stored in the card, received from the gaming table; (ii) decrypt, with use of a public key, the compressed/encrypted player's information of the game chip, received from the gaming table; (iii) judge whether the player's information compressed in the itemized (i) and the player's information compressed/encrypted in the game chip in the itemized (ii) correspond to each other; and (iv) execute a predetermined notification process based on a judgment result in the itemized (iii).

According to the ninth aspect of the present invention, the game chip monitoring system confirms whether a player possessing a card and a player using a game chip are the same person and whether the person is using a legitimate game chip, which is not counterfeited, with the security technology using a digital signature on the condition of a public key cryptosystem. In the case where player information stored in the card does not correspond to player information stored in the game chip, a notification process is performed. Therefore, a fraudulent act can be found out where an illegitimate game chip is used in the game.

A tenth aspect of the present invention is directed to a game chip monitoring system constituted as set forth below. In the ninth aspect, the game chip stores chip unique information in an encrypted condition with use of the private key. The gaming table is capable of reading the encrypted chip unique information of the game chip. The controller receives the chip unique information read from the gaming table; decrypts, with use of the public key, the received chip unique information of the game chip, in the encrypted condition; detects fraudulent of the game chip based on the decrypted chip unique information; and executes the predetermined notification process based on a detection result. Therefore, a fraudulent act such as using an illegitimate game chip can be found out.

According to the tenth aspect of the present invention, the game chip monitoring system detects counterfeit of a game chip based on the chip unique information, with the security technology using a digital signature. Therefore, An eleventh aspect of the present invention is directed to a game chip monitoring system constituted as set forth below. In the ninth aspect, the game chip monitoring system further includes a writer for storing the player's information of the card in the game chip. The writer is configured to: (i) compress the player's information stored in the card, by the predetermined function; (ii) encrypt, with use of the private key, the player's information compressed in the itemized (i); and (iii) write in the game chip, the player's information compressed/encrypted in the itemized (ii).

According to the eleventh aspect of the present invention, the player's information can be written in the game chip in the form of a digital signature, so that security technology can be built up easily.

A twelfth aspect of the present invention is a game chip monitoring system constituted as set forth below. In the eleventh aspect, the writer executes a process in the itemized (iii) after initialization of the compressed/encrypted player's information stored in the game chip.

According to the twelfth aspect of the present invention, the player's information is written in the game chip on the condition that the information in the game chip is initialized, so that the game chip, not storing illegitimate information, can be provided.

The present invention provides a game chip, a game chip writer, a game chip reader, and a game chip monitoring system, which are capable of preventing a fraudulent act without concentrating operation on a center-side device, and moreover, executing a desired operation even in the event of a failure associated with a communication path.

DESCRIPTION OF THE PREFERRED EMBODIMENTS

(A) Main Embodiment

Hereinafter, a first embodiment in which a game chip, a game chip writer, a game chip reader, and a game chip monitoring system according to the present invention are applied to a casino system at a hotel will be described with reference to the drawings.

Figure 1:
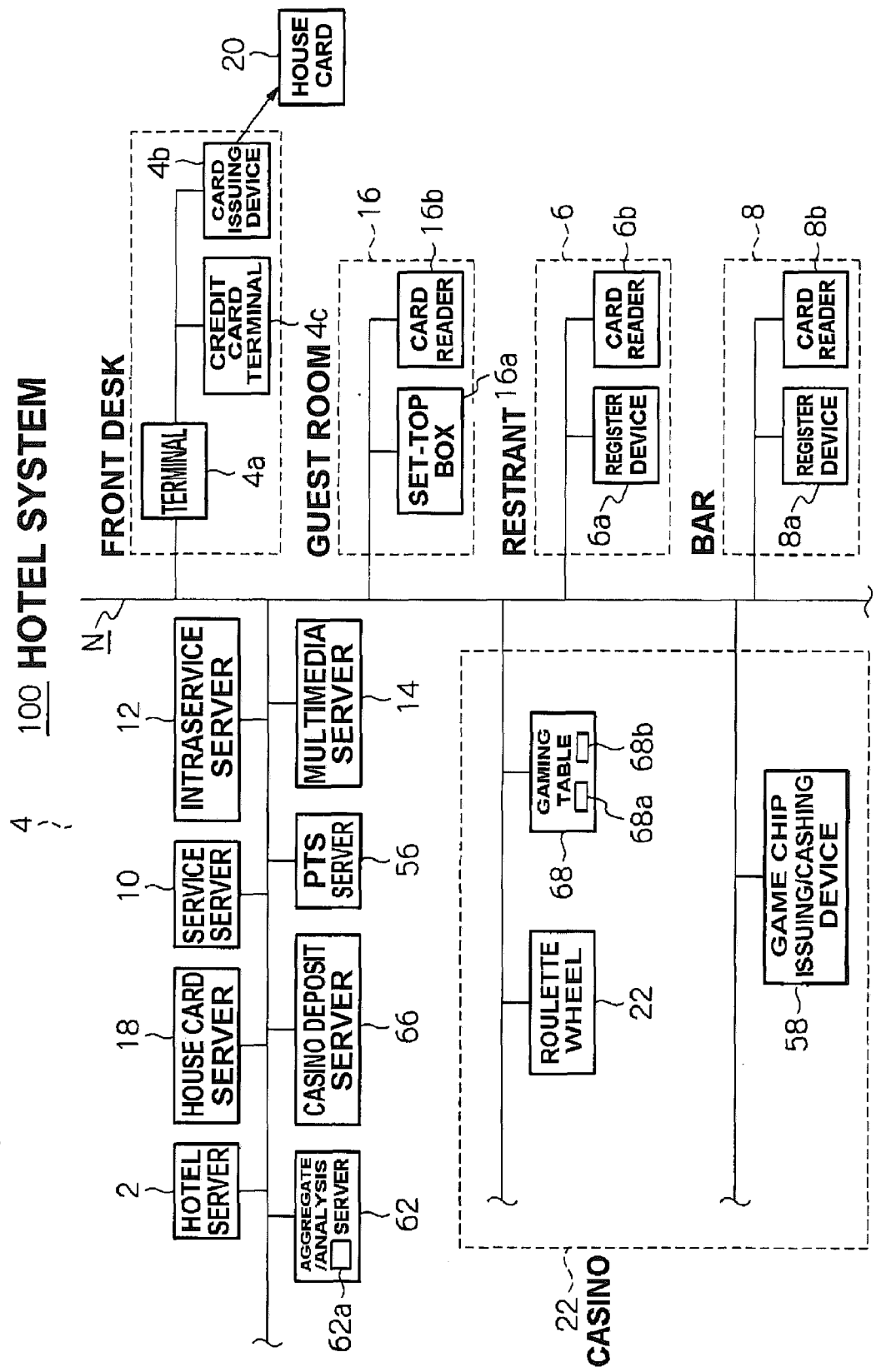
FIG. 1 is a block diagram depicting a configuration of a hotel system including a casino system (a game chip monitoring system) according to an embodiment.

FIG. 1 is a block diagram depicting a configuration of a hotel system including a casino system according to this embodiment.

Referring to FIG. 1, a hotel system 100 includes various types of servers such as a hotel server 2, a service server 10, an intra-service server 12, a multimedia server 14, a house card server 18, a PTS (Player Tracking System) server 56, an aggregate/analysis server 62, and a casino deposit server 66. Furthermore, constituent elements of the system are provided at a front desk 4, a restaurant 6, a bar 8, a guest room 16, a casino 22, and the like. These constituent elements are connected to each other through a network N having any network configuration such as bus, mesh, or ring topology.

At the front desk 4, in addition to a front desk terminal 4a, there are provided: a house card issuing device 4b for issuing a house card 20, the device being accommodated in the front desk terminal 4a; and a credit card terminal 4c for processing a credit card. The house card 20 can identify each of guests staying a hotel provided with this system 100 and also functions as a room key. The house card 20 is formed from at least a magnetic card or an IC card that is readable.

At the restaurant 6 and the bar 8, register devices (register POS equipments) 6a, 8a and card readers 6b, 8b are provided, respectively. The card readers 6b, 8b read the house card 20 to allow the house card 20 to be used as a substitute for cash. In the guest room 16, there are provided: a set-top box 16a to deal with a video on demand or game on demand and the like; and a card reader 16b for reading the house card 20 to perform authentication thereof at the time of implementation of the video on demand or the game on demand using the set-top box 16a.

In the casino 22, in addition to a configuration relating to various games, a game chip issuing/cashing device 58 is provided. The game chip issuing/cashing device 58 exchanges cash and the game chips (issues or cash out game chips) or exchanges deposit and the game chips (issues or cash out game chips) after validating a guest based on the house card 20. Regarding the roulette game, for example, in the casino 22, the roulette wheel 24 and the gaming table 68 are provided in one pair, as described later.

The hotel server 2 is constructed to support various functions for performing overall control over the front terminal 4a, the register devices 6a, 8a, and the like. The service server 10 is constructed to support various functions for making a reservation or issuing tickets for various types of shows or events held in the hotel. The intra-service server 12 is constructed to support a function of controlling an intranet in the hotel. The multimedia server 14 is constructed to support a function of providing movies and games, for example, on a video-on-demand or game-on-demand basis, via the set-top box 16a of the guest room 16.

The house card server 18 is constructed to support various functions for managing the house card 20, an individual account of a holder of the house card 20, and the like. A guest, who checked into the hotel or the casino 22, is issued with the house card 20 to identify the guest, by the card issuing device 4b of the front desk 4. Thereafter, the guest can use predetermined facilities by showing the house card 20 and having checked it out in the hotel or the casino 20. For example, with the register devices 6a, 8a of the restaurant 6 and the bar 8 in the hotel, the house card 20 is read with the card readers 6b, 8b, so that data on the amount of a claim is stored in the hotel server 2. The total amount of a claim is thus displayed on the terminal 4a at the time of check-out. In other words, the house card 20 is linkable with the system so as to manage the game provided by the casino 22 described later, and functions as at least a credit card used to purchase commodity products or pay wining and dining expenses.

The PTS server 56 manages in all, the records of guests' (players') game outcomes (such as outcomes of a roulette game) in the casino 22. The aggregate/analysis server 62 is constructed to support a function of determining payouts by calculation. In a roulette game, for example, with the use of the above function, the aggregate/analysis server 62 determines the payouts of a roulette game in play, by way of calculation based on the rolled position of a roulette ball on the roulette wheel (a rolled-ball position), and a bet position and a bet value (the bet amount) of the aggregated game chips betted by a player. The casino deposit server 66 entirely manages deposits in the casino 22.

Figure 2:
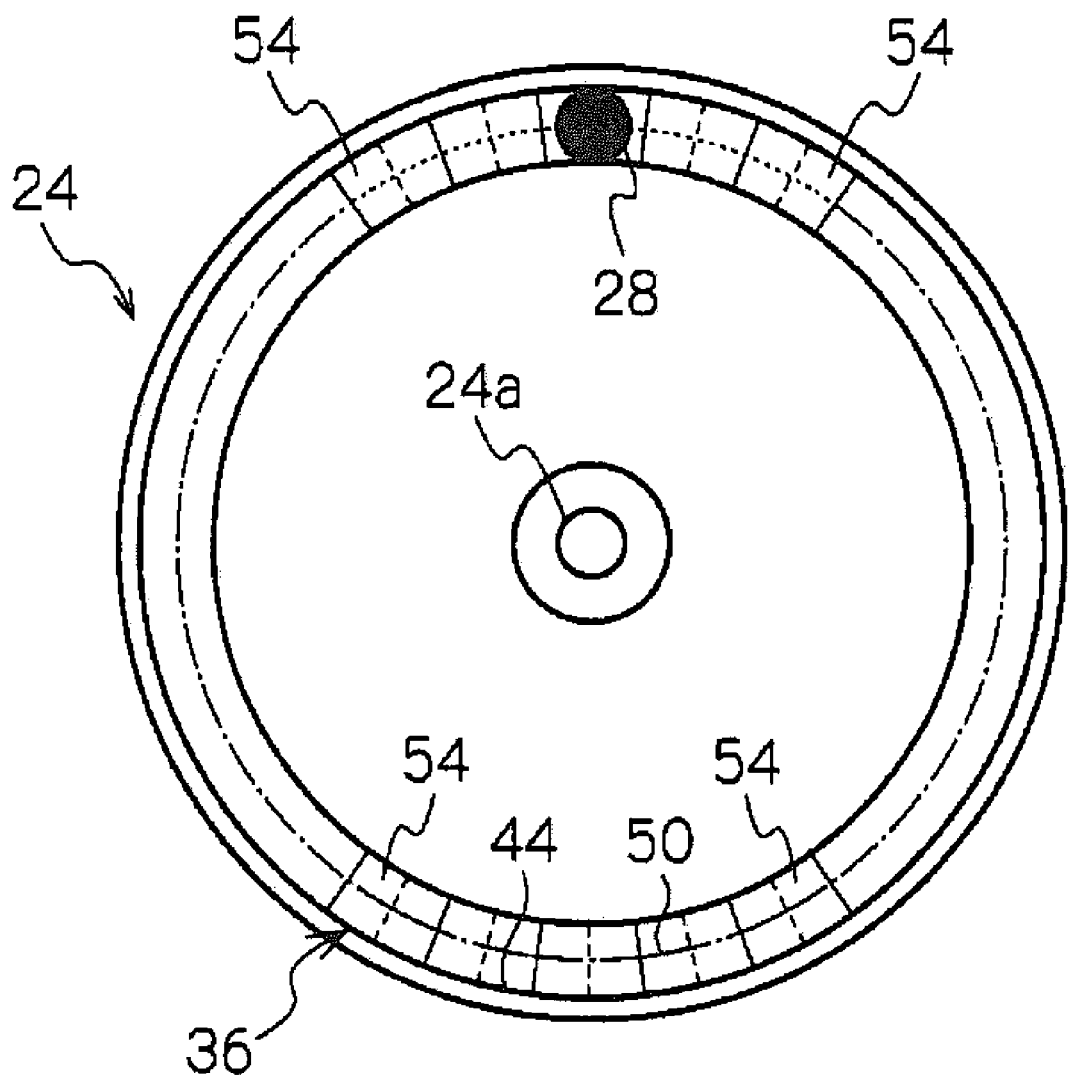
FIG. 2 is a schematic plan view showing a configuration of a roulette wheel according to the embodiment.
Figure 3:
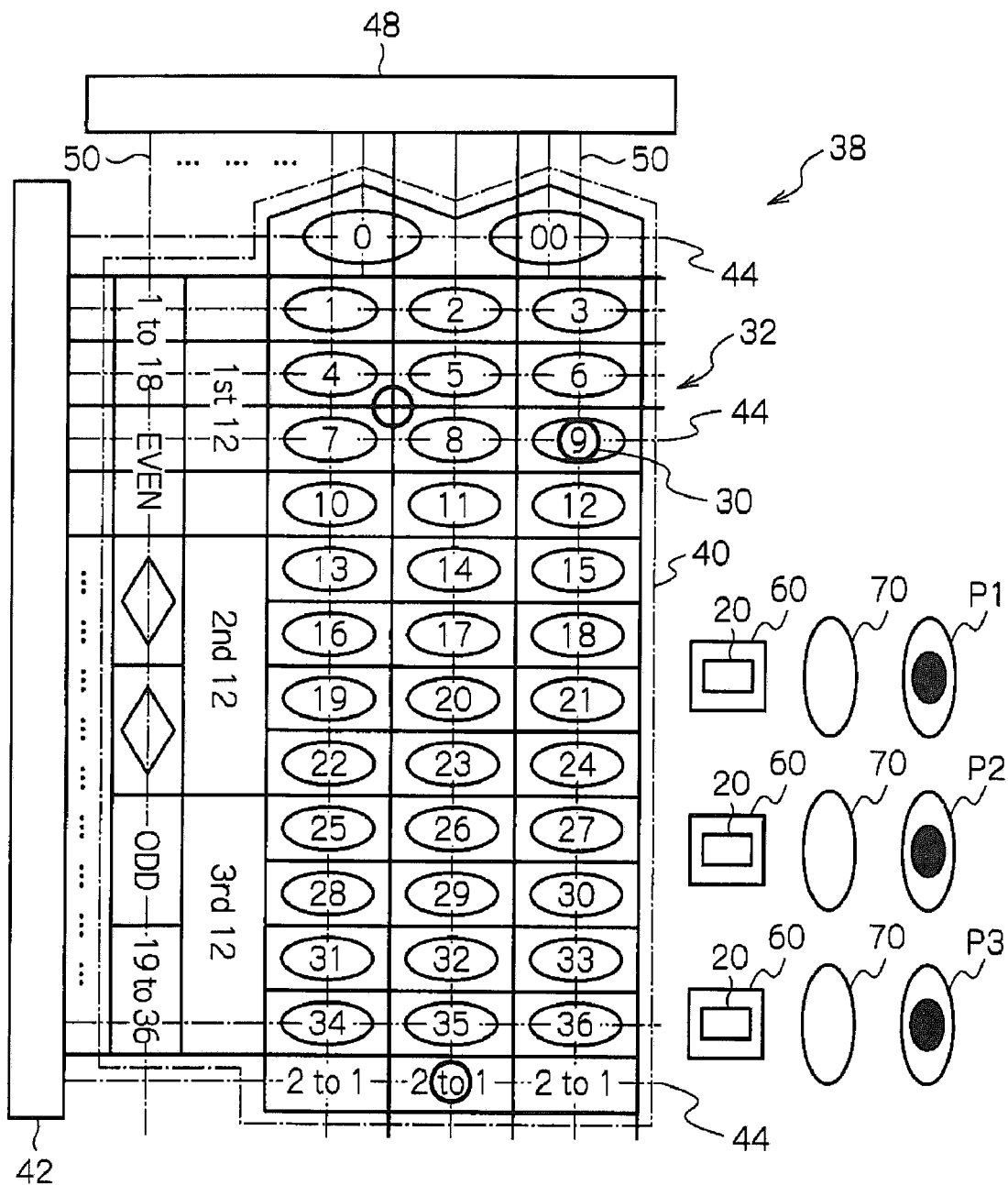
FIG. 3 is a schematic plan view showing a configuration of a gaming table for use in a roulette game according to the embodiment.
Figure 4:
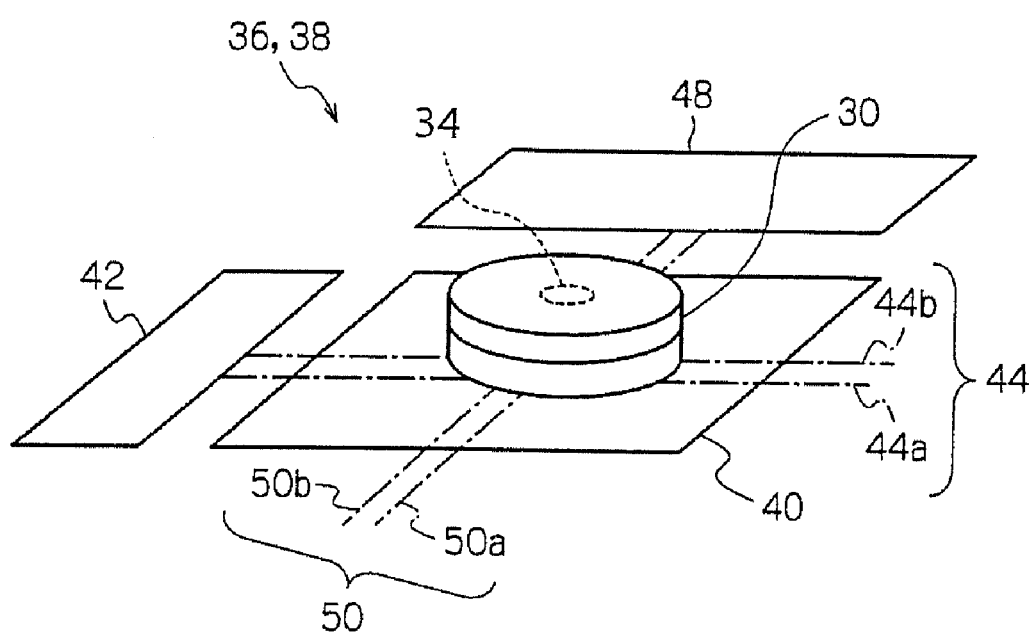
FIG. 4 is a schematic perspective view showing a state of betting a game chip according to the embodiment.

Next, as a configuration example of the casino game, a configuration of the roulette game will be described. FIGS. 2 to 4 are views each showing a configuration of the roulette wheel. FIG. 2 shows a configuration of the roulette wheel. FIG. 3 shows a schematic configuration of the gaming table 68 for the roulette game. FIG. 4 shows a state of betting the game chips.

The roulette game is, as is well known, a game in which players compete by predicting the rolled position of the roulette ball 28 released on the roulette wheel 24, and thereafter, betting the game chips 30 on a betting area corresponding to the predicted rolled-ball position.

As a configuration relating to the roulette game, the hotel system 100 includes a betting board 32, a chip information recorder 34, a rolled-ball position detector 36, a bet information detector 38, a payout calculator 62a, a game chip collector 68a, and a game chip supplier 68b.

The betting board 32 is provided on the gaming table 68, and a plurality of betting areas (such as divided spots with numbers, 0, 00, 1, 2, . . . , 35, 36, and spots divided in a manner to specify columns and rows), corresponding to rolled-ball positions on the roulette wheel 24, are assigned. The betting board 32 is used to place a bet by placing the game chips 30 thereon.

The chip information recorder 34 is provided to each of the game chips 30, in which the information relating to the game chip 30 is recorded. The game information recorder 34 is embedded as an IC tag in each of the game chips 30.

Figure 5:
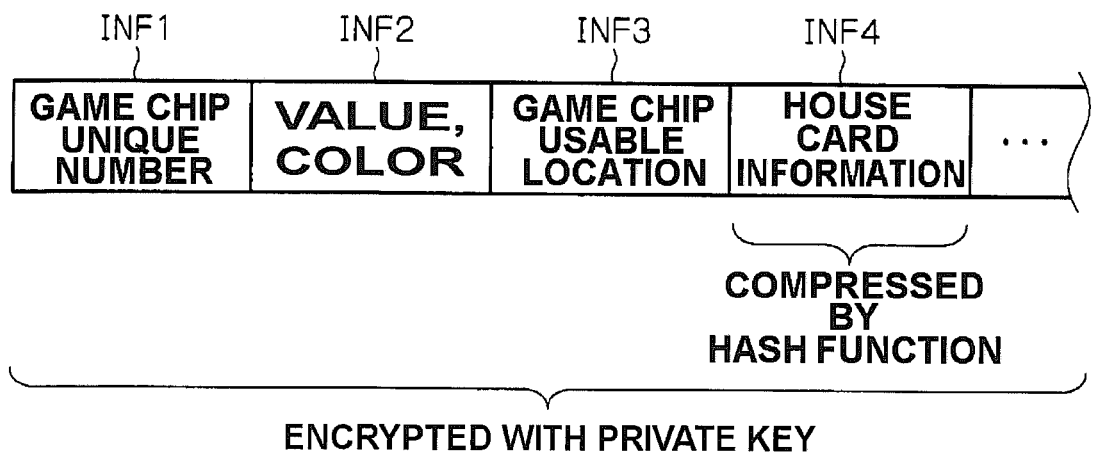
FIG. 5 is an illustrative view of information to be recorded in the game chip according to the embodiment.

The information relating to the game chip 30, recorded in the chip information recorder 34 contains, as shown in FIG. 5, information relating to unique number (such as game chip identifying number) information INF 1 for specifying the game chip 30, value (such as 1 dollar, 5 dollars, and 10 dollars) and color information INF 2, game chip 30 usable location (such as casino 22) information INF 3, information INF 4 for specifying a player allowed to possess the game chip 30 (such as information relating to the house card 20 associated with the player). Here, at least the information INF 4 relating to the player, who is allowed to possess the game chip 30, is compressed by a hash function. All items of the information INF 1, INF 2, INF 3, INF 4 are encrypted with a private key, and the encrypted items of the information are recorded in the game chip 30.

The rolled-ball position detector 36 provided to the roulette wheel 24 detects a position on the roulette 24, at which the roulette ball 28 rolled, and a type of the rolled-ball position.

The bet information detector 38 is provided on the betting board 32, and detects a bet position and a bet value of the game chip 30 by reading the information relating to the game chip 30, the information being recorded in the chip information recorder 34 when the game chip 30 is betted on a betting area.

The rolled-ball position detector 36 and the bet information detector 38 have a common base configuration made up of an ID reader and a weighting unit 40, as shown in FIG. 4. The ID reader is configured by aligning X-side antenna elements 44*a*, 44*b*, and Y-side antenna elements 50*a*, 50*b* perpendicularly to each other. The X-side antenna elements 44*a*, 44*b* (hereinafter, referred to as an X-side antenna 44) extend in parallel to each other from a X-side scan driver 42 and the front ends thereof are connected to each other in a manner such that a loop antenna is formed. The Y-side antenna elements 50*a*, 50*b* (hereinafter, referred to as a Y-side antenna 50) extend in parallel to each other from a Y-side scan driver 48 and the front ends thereof are connected to each other in a manner to form a loop antenna.

With the ID reader, when the X-side antenna 44 transmits a reading radio wave (question radio wave) in a condition that the game chip 30 is placed on the betting area on the betting board 32, the vicinity of an area where the X-side antenna is laid down serves as a region of interest to be read. When the Y-side antenna 50 transmits a scanning radio wave, the vicinity of an area where the Y-side antenna 50 is laid down serves as a region of interest to be read. As a result, a crossing point between these antennas serves as a region of interest to be read. Where the game chip 28 is placed around a crossing point, the chip information recorder (IC tag) 34 of the game chip 28 sends back a response radio wave including the recorded information in response to an incoming reading radio wave (question radio wave), and the X-side antenna 44 and the Y-side antenna 50 capture the response radio wave.

The bet information detector main body (not shown) is given the response radio wave through the scan drivers 42, 48, the wave having been captured by the X-side antenna 44 and the Y-side antenna 50. This main body recognizes: a bet position on which the game chip 30 is placed; and raw data of the information recorded in the game chip 30. A combination of the X-side antenna 44 and the Y-side antenna 50 that captured the response radio wave defines the bet position.

Figure 6:
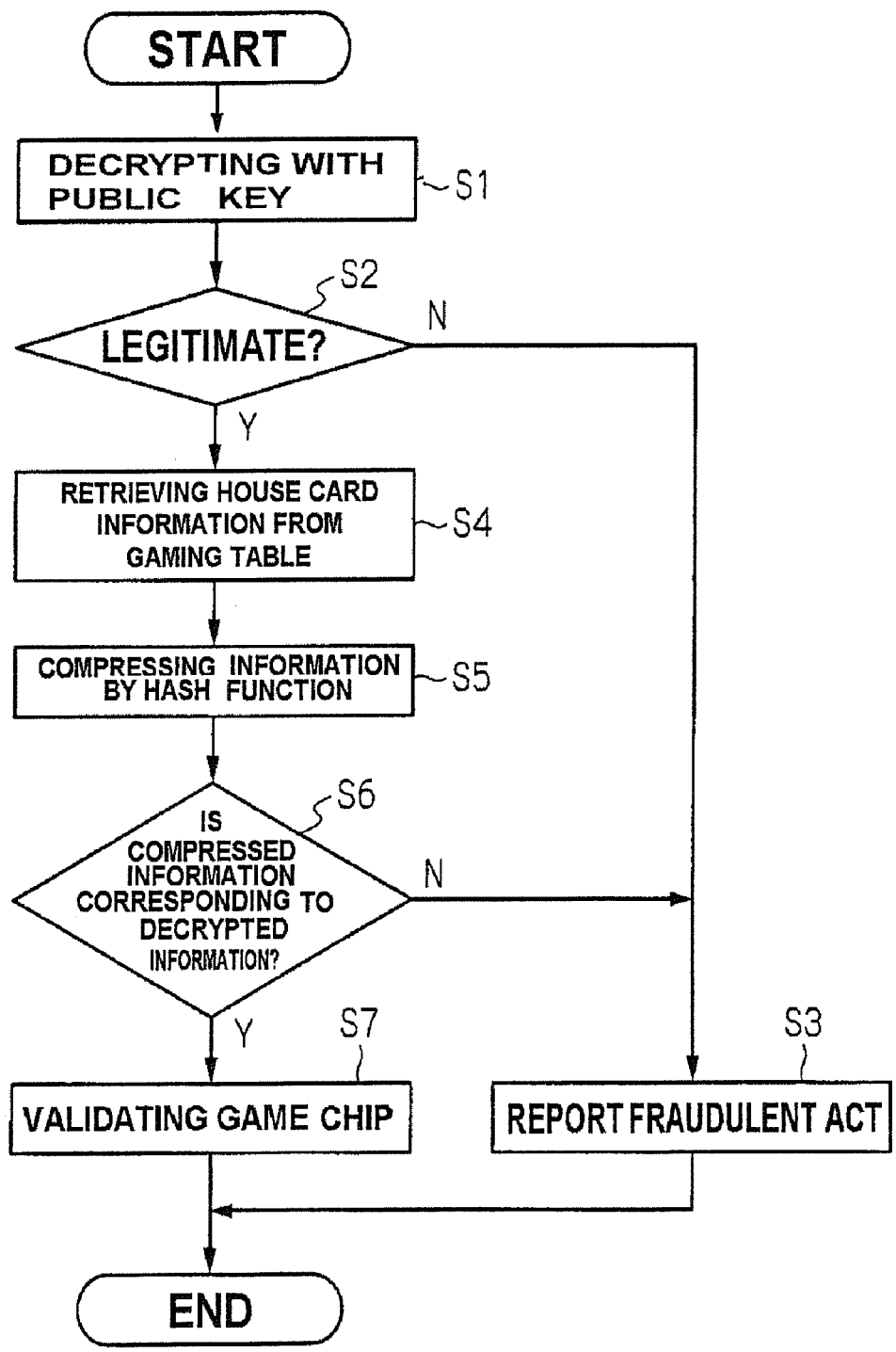
FIG. 6 is a flowchart showing a process to be executed when recording-information is assigned to the game chip according to the embodiment.

The bet information detector main body executes a process as shown in FIG. 6 if the information recorded in the game chip 30 is assigned.

The bet information detector main body decrypts the assigned recorded information, with use of a public key (S1).

Then, the bet information detector main body judges whether or not the game chip 30 is legitimate, based on the information obtained by the decryption, such as the unique number (game chip identifying number) information INF 1 for specifying the game chip 30, the value (such as 1 dollar, 5 dollars, and 10 dollars) and color information INF 2, and the game chip 30 usable location (such as the casino 22) information INF 3 (S2). At the time of this judgment, the bet information detector main body may conduct communication with the PTS server 56 if necessary. For example, the bet information detector main body may verify whether or not the unique number of the game chip 30, which is obtained by the decryption, is one of the unique numbers assigned by the casino. It should be noted that this verification by means of communication is not required in the case where the bet information detector main body holds the data relating to a list of the unique numbers.

In the case where the bet information detector main body cannot verify that the game chip 30 is legitimate, the gaming table and various types of servers, for example, report a fraudulent act notification (S3). When judging the game chip 30 is legitimate based on the information INF 1 to INF 3, the house card information of each of players P1, P2, P3 enjoying the roulette game at the gaming table 68 is retrieved from the PTS server 56 (S4). Each item of the retrieved house card information is compressed by a hash function (S5). The PTS server 56 may execute a compressing process by a hash function, prior to transmission of the house card information. The bet information detector main body judges whether or not the house card information after thus compressed contains the information corresponding to the information INF 4 for specifying a player who is allowed to possess the house card, the information INF 4 being obtained by the decryption (S6). It should be noted that the process at step S6 corresponds to a digital signature confirming process.

If no corresponding information is present as the result of the judgment at step S6, the fraudulent act notification operation is executed (S3). On the other hand, when the house card information after compressed includes information corresponding to the information INF 4 for specifying the player who is allowed to possess the house card, the information INF 4 being obtained by the decryption, in other words, when the digital signature is verified, the betted game chip 30 is validated (S7).

The thus detected data, of which legitimacy is verified, is sent to the PTS server 56 or the aggregate/analysis server 62, so that the associated data records are managed in all or is utilized to calculate payouts.

Next, such a case will be described, that the ID reader is applied to the rolled-ball position detector 36. As shown in FIG. 2, the roulette wheel 24 has a structure in the form of a circular rotator, in which a total of thirty eight pockets 54 (partially shown in FIG. 2) are formed concentrically with respect to a central axis 24*a*. These pockets 54 are printed by numbers corresponding to the plurality of bet areas assigned to the betting board 32, respectively. The rolled-ball position detector 36 is provided to each of the thirty eight pockets 54. When the roulette ball 28 rolled in one of the pockets 54, the roulette 28 is positioned on the crossing point of the above-described ID reader. Because the above-described reading radio wave is always in an upright condition during the play, when the roulette ball 28 is positioned on the crossing point, only the reception condition of the reading radio wave from the pocket 54 corresponding to the cross point changes. In this manner, the rolled-ball position detector 36 detects which one of the positions (which one of the pockets 54) on the roulette wheel 24 the roulette ball 28 has rolled in. At this time, the detected data is transmitted to the PTS server 56 or the aggregate/analysis server 62, so that the data is utilized to determine payouts by calculation or records of the data are managed in all.

The weighting units 40 are disposed so as to cover the betting areas on the betting board 32. An electric weighting scale such as a semiconductor pressure sensor, for example, can be employed as the weighting unit 40. The weighting unit 40 records a chip weight per game chip therein, and can calculate the number of betted game chips 30, by dividing a total weight value of the game chips 30 betted on the batting board 32 by a weight per chip. In this case, after the calculated number of game chips 30 and the detection result of the bet information detector 38 are compared with each other, if they are different from each other, it is judged that a counterfeit chip has been illegally used, and the fact is notified to a dealer, for example.

On the roulette ball 28, a roulette ball identifying information recorder (not shown) is provided, the recorder having recorded roulette ball identifying information for identifying the roulette ball 28 therein. The roulette ball identifying information recorder is embedded as an ID tag in the roulette ball 28. The roulette ball identifying information contains information such as a source of the roulette ball 28, a ball usable location (the casino 22, for example), and a type of the ball.

The roulette ball identifying information recorded in the roulette ball identifying information recorder can be read with the ID reader of the rolled-ball position detector 36, thereby allowing discrimination between a usable roulette ball 28 and an unusable one based on the read information. In this manner, such a fraudulent act or an infringement as the use of carried counterfeit roulette ball 28 can be completely prevented.

The payout calculator 62a constructed on the aggregate/analysis server 62 determines payouts of the game (roulette game) by means of calculation based on a position of the roulette ball 28 on the roulette wheel 24, and the bet position and a value of the game chips 30. It should be noted that the payout calculator 62a may be provided on the gaming table 68.

The game chip collector 68a provided on the gaming table 68 has a collector opening. At the end of each roulette game, the game chips 30 betted on the betting board 32 are gathered with a collection tool formed in a rake or T-letter shape, and then, the gathered chips are moved from the collection opening to a storage unit. In the storage unit, the collected game chips 30 are separated and stored based on a value or a player playing the game. The storage unit is configured to read and recognize information on the game chip 30.

The game chip supplier 68b provided on the gaming table 68 supplies to a chip receiver 70 the game chips 30 corresponding to a payout at a corresponding player. The chip receiver 70 is provided on the gaming table 68, for example, in the vicinity of a house card reader 60 described later. In the case where the storage unit contains the game chips as much as a payout, the game chips having been provided by a player who is to be paid out, the game chip supplier 68b supplies the player with them.

In the case where the storage unit contains the game chips less than the payout, the game chips having been placed by the player who is to be paid out (including a case of no game chips), the game chip supplier 68b determines and pays out the game chips from among those placed by a player other than the player targeted to be paid out, more specifically, a player other than the current players.

Figure 7:
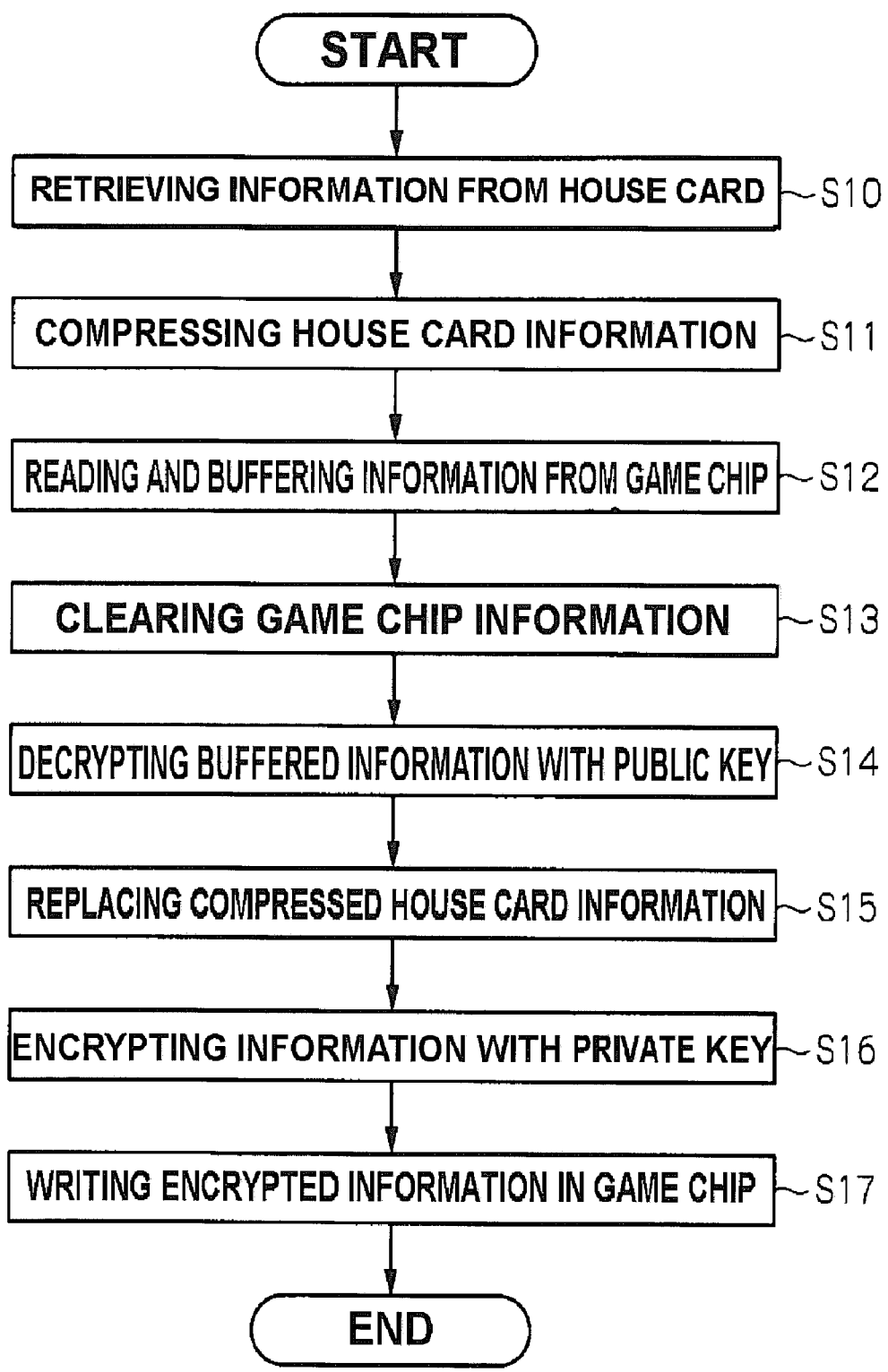
FIG. 7 is a flowchart showing a process to be executed when the recording-information is recorded in the game chip according to the embodiment.

Upon supplying the game chips placed by a player other than the player targeted to be paid, more specifically, a player other than the current players, the storage unit supplies the game chips after performing an information updating process as shown in FIG. 7.

The game chip supplier 68b retrieves the house card information of the player targeted to be paid out, from the house card reader 60 on which the house card 20 of the player targeted to be paid out is placed (S10). The house card information is compressed by a hash function (S11).

The recording-information read from the game chip 30 to be paid out is buffered (S12), and thereafter, the buffered information is cleared (for example, by writing all zeros) (S13).

The recording-information retrieved by reading is decrypted with use of the public key (S14). From among decrypted information sequences, the information INF 4 for specifying a person allowed to possess the game chip 30 is replaced with the house card information which was compressed at step S11 (S15). The information sequence obtained after the replacement is encrypted with use of the private key (S16), and the encrypted information is written in the game chip 30 to be supplied (S17).

Hereinafter, a flow of operation performed after a person (player) who desires to play a roulette game is admitted in the casino 22 will be described.

Each of the players P1, P2, P3 who desire to play a roulette game at the casino 22 acquires the predetermined number of game chips 30 by the game chip issuing/cashing device 58 when each of them with the house card 20 is admitted in the casino 22. The game chip issuing/cashing device 58 has a structure to read the house card 20. The game chip issuing/cashing device 58 issues the stored game chips after rewriting the house card information INF 4 for the person who is going to acquire the game chip 30 through a process shown in FIG. 7 described above. At the time of issuing the game chip, the chip issuing/cashing device 58 transmits the information relating to this issuance to the PTS server 56 or the like.

Each of the players P1, P2, P3 issued with the game chips 30 by the game chip issuing/cashing device 58 goes to the gaming table 68 for the roulette game and sets the house card 20 on the house card reader 60 of the betting board 32. At this time, the house card reader 60 reads the contents of the house card 20 to specify and recognize each of the players P1, P2, P3 as a participant. The data recognized by the house card reader 60 is transmitted to the PTS server 56, and then, the transmitted data is registered as participants P1, P2, P3 in the current game.

In the roulette game, first, a dealer spins the roulette wheel 24 and releases the roulette ball 28. During this operation, each of the participants P1, P, P3 bets the game chips 30 on the betting board 32. At this time, the bet information detector 38 detects a position on which each of the participants P1, P2, P3 places a bet and a bet value (for example, one dollar, five dollars, ten dollars: bet amount), and the detection result is transmitted to the PTS server 56, thereby allowing the PTS server 56 to manage records of the detection results in all.

When spinning of the roulette wheel 24 becomes slowly and the roulette ball 28 falls into any of the pockets 54, thereby determining a rolled-ball position. The rolled-ball position detector 36 detects the landing position of the roulette ball 28 and transmits the detection result to the PTS server 56, thereby allowing the PTS server 56 to manage records of the detection result in all.

The payout calculator 62a is constructed in the aggregate/analysis server 62, and determines the payout amount of this game (roulette game) by means of calculation based on the position (landing position) of the roulette ball 28 on the roulette wheel 24 and the bet position and the bet value (bet amount) of the gaming chips 30.

The dealer collects the placed game chips 30. In the case where there is a player who placed the gaming chip on a position corresponding to the rolled-ball position, the game chip supplier 68b supplies the chip receiver 70 at the corresponding player with the game chips 30 corresponding to the payout amount calculated by the payout calculator 62a.

When the player possesses the game chips 30 when leaving the casino 22, the game chip is exchanged with cash by the game chip issuing/cashing device 58. When exchanging the game chip 30 with cash, the game chip issuing/cashing device 58 reads out the information stored in the house card 20 and verifies validity of the game chip 30 by performing a process as shown in FIG. 6. Upon verifying the validity, the game chip issuing/cashing device 58 discharges a currency equal to a value of the game chip 30 or increases a deposit relating to the information stored in the house card 20 as much as a value of the game chips 30.

According to the above embodiment, the information recorded in the game chip is encrypted with use of the private key and the encrypted information is recorded, and thereafter, the recorded information can be decrypted with use of the public key, thus attaining the following advantageous effects.

Use of the same key for encryption and decryption makes it easy to counterfeit the game chip in the case where the key is stolen. In the above embodiment, however, even if the key is figured out from the game chip, the game chip cannot be counterfeited because the key is a public key.

To encrypt and decrypt the information with use of the same key, it is contemplated that a center-side server decrypts the information in consideration of inconvenience if the key is stolen. In this case, however, the center-side server is often overloaded, and processing might slow down. Furthermore, if a communication path to the center-side server fails, decryption cannot be performed. In the above-embodiment, the information to be recorded in the game chip is encrypted with use of the private key, which makes it difficult to counterfeit the game chip, so that each of the game devices, not the center-side server, is allowed to perform decryption. In other words, the decryption process can be executed in the casino in a decentralized manner, thus making it possible to prevent the slowdown of the process due to concentration of operation or an event that the decryption process cannot be performed if the communication path fails.

According to the above embodiment, the information relating to a person possessing the game chip is recorded by being digitally signed to allow the information confirmable, thus making it possible to detect use of the legitimate game chip by a fraudulent player.

(B) Other Embodiments

While the above embodiment described the roulette game with use of the game chip, any kinds of games with use of the game chip are available without limitative thereto.

The information recorded in the game chip is not limited to one described in the above-embodiment. The information may include, for example, an expiration date of the chip, identification information of the game chip issuing/cashing device 58 which issues the chip, and the like.

While the above embodiment described the fact that the private key and the public key are set in one pair, these keys may be used in plural pairs.

Pairs of keys may be changed daily or weekly, for example. In this case, the game chip before changed may be handled as an invalid game chip or a valid game chip. In the latter case, a decryption device may be designed to decrypt the information using the plurality of public keys at once. In the case where any of the keys can be legitimately used for decryption, the information may be used for the process. Alternatively, the information indicating which of pairs is applied may be recorded without being encrypted, into the game chip, thereby selecting the public key based on the information.

Pairs of keys may be changed for each type of the game chip issuing/cashing device 58, for example. In this case, the decryption device may also be designed to decrypt the information using the plurality of public keys at once. In the case where any of the keys can be legitimately used for decryption, the information may be used for the process. Alternatively, the information indicating which of pairs is applied may be recorded without being encrypted, into the game chip, thereby selecting the public key based on the information.

While the above embodiment presented the fact that the information relating to the digital signature is defined as the player formation (house card information), other information may be defined as the information relating to the digital signature instead thereof or in addition thereto. For example, the expiration date of the chip may be set as the information relating to the digital signature. Furthermore, a name or password, which is input by pressing keys of the game chip issuing/cashing device 58 or the gaming table 68, may be set as the information relating to the digital signature.

While the above embodiment described the fact that the game chip records the recording-information in a rewritable manner. However, the recording-information may be recorded in a manner not to be rewritable.

While the above embodiment described the fact that the game chip issuing/cashing device 58 or the gaming table 68 encrypts the information with use of the private key, the server on the center side may encrypt the information with use of the private key, whereas the game chip issuing/cashing device 58 or the gaming table 68 may write the description information. In this case, it is also preferable that the game chip issuing/cashing device 58 or the gaming table 68 perform the decryption process.

Figure 8:
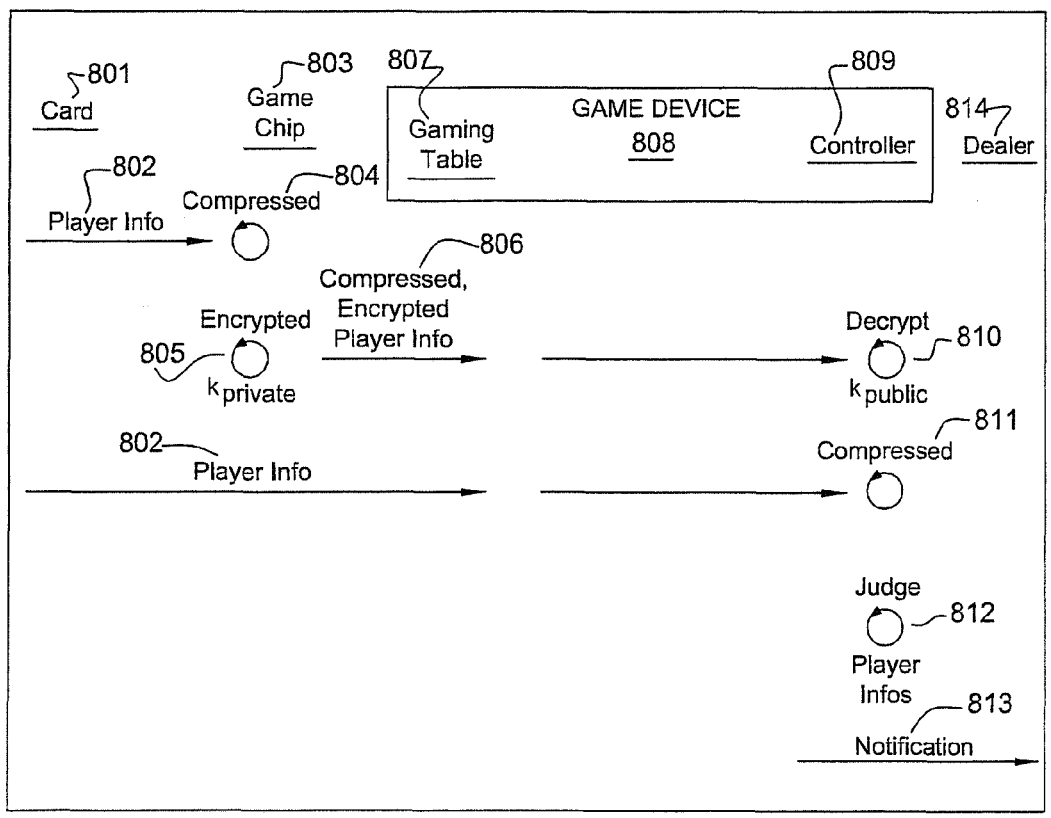
FIG. 8 is a schematic illustration of data transfer between multiple entities/devices.

Referring to FIG. 8, the data transfer between multiple entities/devices, according to one embodiment, is illustrated. A game chip-monitoring system can include a card 801 configured to store thereon a player's information 802; a game chip 803 configured to compress 804 the player's information stored on the card using a predetermined function to do so, wherein the game chip is configured to use a private key 805 to store the compressed player's information 806 in an encrypted condition; a gaming table 807 configured to read from the card the player's information stored thereon and the compressed/encrypted information stored in the game chip; and a controller 809 disposed within a game device 808 including the gaming table 807, the controller being configured to receive from the gaming table the information read from the card and from the game chip, the controller being configured to (i) compress 811, using the predetermined function, the player's information stored on the card; (ii) decrypt 810, using a public key, the compressed/encrypted player's information received from the game chip; (iii) judge 812 whether the player's information that has been compressed in step (i) and the player's information compressed/encrypted on the game chip and decrypted in step (ii) correspond to each other by collating the information with each other using a digital signature system; and (iv) execute a predetermined fraudulent-act notification process 813 in a case where the information does not correspond to each other as a result of a judgment in step (iii), and set as valid the game chip having been bet in a case of the information corresponding to each other; wherein the controller performs (i), (ii), (iii), and (iv) at a side of the game device. The notification can be sent to a dealer 814.

What is claimed is:

1. A game chip-monitoring system, comprising:
a card configured to store thereon a player's information;
a game chip configured to compress the player's information stored on the card using a predetermined function to do so, wherein the game chip is configured to use a private key to store the compressed player's information in an encrypted condition;
a gaming table configured to read from the card the player's information stored thereon and the compressed/encrypted information stored in the game chip; and
a controller disposed within a game device including the gaming table, the controller being configured to receive from the gaming table the information read from the card and from the game chip, the controller being configured to
  (i) compress, using the predetermined function, the player's information stored on the card;
  (ii) decrypt, using a public key, the compressed/encrypted player's information received from the game chip;
  (iii) judge whether the player's information that has been compressed in step (i) and the player's information compressed/encrypted on the game chip and decrypted in step (ii) correspond to each other by collating the information with each other using a digital signature system; and
  (iv) execute a predetermined fraudulent-act notification process in a case where the information does not correspond to each other as a result of a judgment in step (iii), and set as valid the game chip having been bet in a case of the information corresponding to each other;
wherein the controller performs (i), (ii), (iii), and (iv) at a side of the game device.

2. The game chip-monitoring system according to claim 1, wherein:
the game chip is configured to store chip-unique information in an encrypted condition using the private key to do so;
the gaming table is configured to read from the game chip the encrypted chip-unique information; and
the controller is configured to (1) receive from the gaming table the chip-unique information read by the gaming table; (2) decrypt, using the public key to do so, the chip-unique information that has been received in the encrypted condition; (3) detect fraudulent use of the game chip based on the decrypted chip-unique information; and (4) execute the predetermined notification process based on a detection result.

3. The game chip-monitoring system according to claim 1, further comprising a writer configured to store on the game chip the player's information that has been read from the card, wherein the writer is configured to (1) compress the player's information that has been read from the card using the predetermined function to do so; (2) encrypt, using the private key to do so, the player's information that has been compressed in step (1); and (3) write on the game chip the player's information compressed/encrypted in step (2).

4. The game chip-monitoring system according to claim 3, wherein the writer executes step (3) after initializing the compressed/encrypted player's information stored on the game chip.

* * * * *